United States Patent
Moskalev et al.

(10) Patent No.: US 10,483,709 B2
(45) Date of Patent: Nov. 19, 2019

(54) SUB-NANOSECOND BROAD SPECTRUM GENERATING LASER SYSTEM

(71) Applicant: IPG PHOTONICS CORPORATION, Oxford, MA (US)

(72) Inventors: Igor Moskalev, Oxford, MA (US); Sergey Vasilyev, Oxford, MA (US); Michael Mirov, Oxford, MA (US); Valentin Gapontsev, Oxford, MA (US)

(73) Assignee: IPG PHOTONICS CORPORATION, Oxford, MA (US)

( * ) Notice: Subject to any disclaimer, the term of this patent is extended or adjusted under 35 U.S.C. 154(b) by 0 days.

(21) Appl. No.: 15/764,686

(22) PCT Filed: Sep. 22, 2016

(86) PCT No.: PCT/US2016/053008
§ 371 (c)(1),
(2) Date: Mar. 29, 2018

(87) PCT Pub. No.: WO2017/062181
PCT Pub. Date: Apr. 13, 2017

(65) Prior Publication Data
US 2018/0278006 A1 Sep. 27, 2018

Related U.S. Application Data

(60) Provisional application No. 62/237,821, filed on Oct. 6, 2015.

(51) Int. Cl.
*H01S 3/00* (2006.01)
*H01S 3/108* (2006.01)
(Continued)

(52) U.S. Cl.
CPC .......... *H01S 3/0092* (2013.01); *G02F 1/3511* (2013.01); *G02F 1/3536* (2013.01); *G02F 1/3551* (2013.01); *H01S 3/0057* (2013.01); *H01S 3/042* (2013.01); *H01S 3/0407* (2013.01); *H01S 3/0619* (2013.01); *H01S 3/08059* (2013.01); *H01S 3/108* (2013.01);
(Continued)

(58) Field of Classification Search
None
See application file for complete search history.

(56) References Cited

U.S. PATENT DOCUMENTS 6,181,463 B1 * 1/2001 Galvanauskas ........ A61B 18/22
                                                             359/330
10,216,063 B2 * 2/2019 Vasilyev .................... G02F 1/39
(Continued)

OTHER PUBLICATIONS

G. Holtom, R. Crowell, and X. Xie, "High-repetition-rate femtosecond optical parametric oscillator-amplifier system near 3 μm," J. Opt. Soc. Am. B 12, 1723-1731 (1995). (Year: 1995).*

*Primary Examiner* — Rhonda S Peace
(74) *Attorney, Agent, or Firm* — Yuri B. Kateshov, Esq.; Timothy J. King, Esq.; Caroline J. Roush, Esq.

(57) ABSTRACT

The present invention provides systems and methods for producing short laser pulses that are amplified and spectrally broadened in a bulk gain media. The bulk material, having laser gain and nonlinear properties, is concurrently exposed to an optical pump input and a seed input, the pump power being sufficient to amplify and spectrally broaden the seed pulse.

10 Claims, 3 Drawing Sheets

(51) Int. Cl.

| | | |
|---|---|---|
| *G02F 1/35* | (2006.01) | |
| *H01S 3/23* | (2006.01) | |
| *G02F 1/355* | (2006.01) | |
| *H01S 3/06* | (2006.01) | |
| *H01S 3/109* | (2006.01) | |
| *H01S 3/16* | (2006.01) | |
| *H01S 3/094* | (2006.01) | |
| *H01S 3/11* | (2006.01) | |
| *H01S 3/04* | (2006.01) | |
| *H01S 3/042* | (2006.01) | |
| *H01S 3/08* | (2006.01) | |
| *H01S 3/081* | (2006.01) | |

(52) U.S. Cl.
CPC .......... *H01S 3/109* (2013.01); *H01S 3/1112* (2013.01); *H01S 3/1608* (2013.01); *H01S 3/1623* (2013.01); *H01S 3/1628* (2013.01); *H01S 3/1685* (2013.01); *H01S 3/2308* (2013.01); *G02F 2001/3542* (2013.01); *G02F 2203/11* (2013.01); *G02F 2203/26* (2013.01); *H01S 3/0813* (2013.01); *H01S 3/094042* (2013.01); *H01S 3/094076* (2013.01)

(56) References Cited

U.S. PATENT DOCUMENTS

| | | | | |
|---|---|---|---|---|
| 2009/0129413 | A1* | 5/2009 | Richter | G03H 1/02 372/10 |
| 2010/0246610 | A1* | 9/2010 | Mirov | C30B 31/00 372/10 |
| 2011/0069375 | A1* | 3/2011 | Lin | G02F 1/39 359/328 |
| 2012/0049092 | A1* | 3/2012 | Tu | G02F 1/353 250/504 R |
| 2017/0018903 | A1* | 1/2017 | Vasilyev | H01S 3/1112 |
| 2018/0113372 | A1* | 4/2018 | Vasilyev | G02F 1/39 |
| 2018/0278006 | A1* | 9/2018 | Moskalev | H01S 3/0619 |

* cited by examiner

FIGURE 1
FIGURE 2
(a)
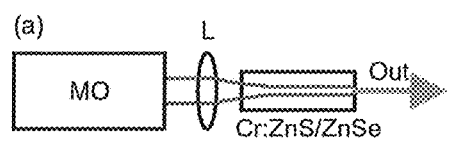
(b)
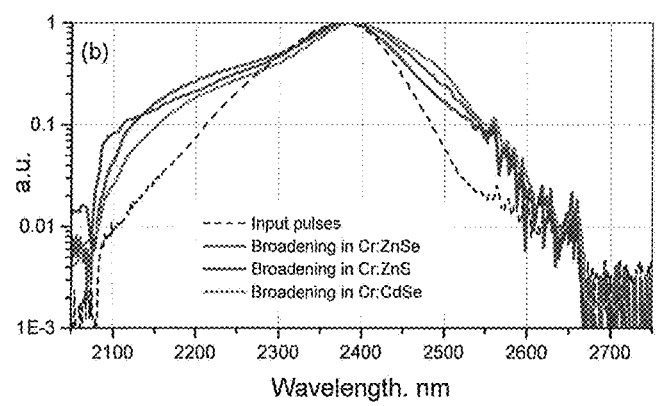

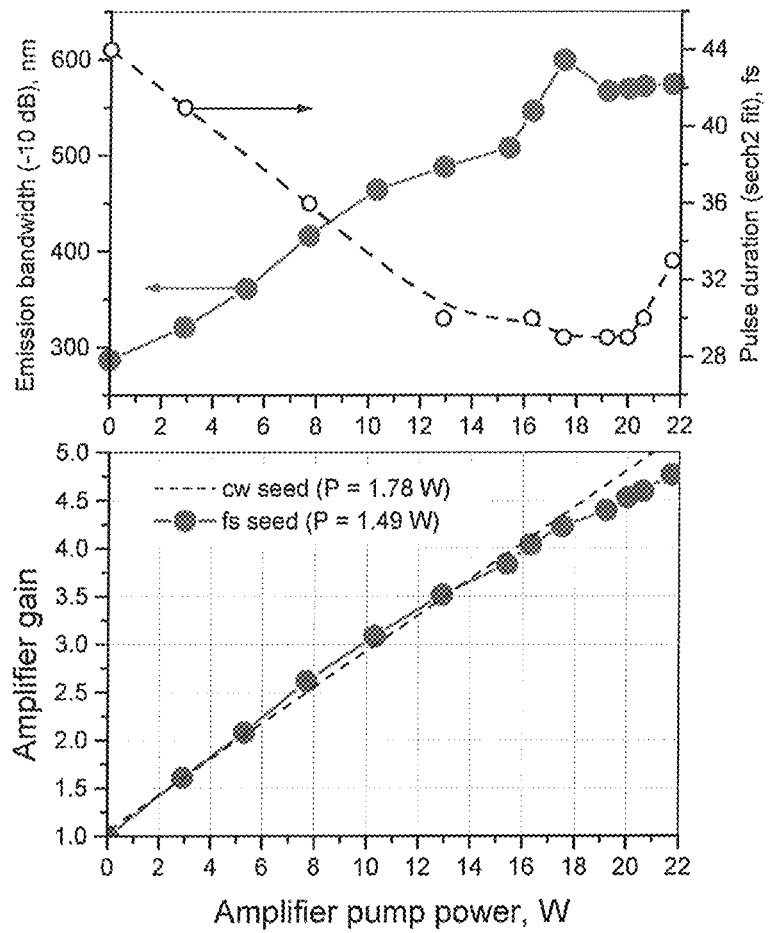
FIGURE 7
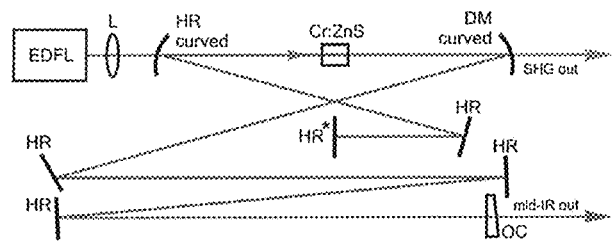

SUB-NANOSECOND BROAD SPECTRUM GENERATING LASER SYSTEM

BACKGROUND OF THE DISCLOSURE

Field of the Disclosure

The disclosure relates to novel laser system configurations and outputs premised upon the simultaneous seeding and pumping of a solid state material with gain and nonlinear properties whereby the solid state material at least amplifies and spectrally broadens a seed pulse in a single pass through the solid state material. Further nonlinear optical effects such as pulse compression are also evident.

Background of the Disclosure

Pulsed laser sources, which combine ultra-short or femtosecond (fs) pulse duration, high average power, and broad optical spectrum are in great demand for a variety of applications in spectroscopy, sensing, coherence tomography, bio-medical, and so on. Extending the spectrally broad laser oscillations to 2-10 μm, the so-called mid-IR range, is highly desired for detection of the substances which feature the resonant fingerprints in mid-IR, e.g. common molecules (including, but not limited to $H_2O$, $CO_2$, $CO$, and $NH_4$), biomedical materials, air pollutants, hazardous materials. Moreover, high power mid-IR fs sources with broad and coherent optical spectrum are of extreme importance for the time-resolved studies of the fundamental processes in physics and chemistry.

The standard technique for spectral broadening of fs pulses is so-called supercontinuum generation (SCG). In the past decade SCG has been mostly explored in fibers and waveguides. SCG covering the whole mid-IR 'fingerprint region' has been demonstrated very recently in a chalcogenide step-index fiber. However, there are intrinsic peak and average power limitations and alignment sensitivity issues with the methods of fiber- or waveguide-based SCG.

More recently, SCG in bulk materials started to show new opportunities with its advantages such as relative simplicity, flexibility, high peak and average power. Moreover, SCG in some bulk materials features compression of femtosecond input pulse to even shorter output pulse comprising only few optical cycles. An important parameter, which defines the ability of the bulk medium to generate a broad continuum, is so called critical power for self-focusing $P_C$. The critical power is a material-specific parameter and is defined by third-order nonlinearity of the material via the nonlinear refractive index n2: $P_C \sim \lambda^2/n_2$. The critical power may vary from hundreds of kW (e.g. in II-VI semiconductors like ZnSe and ZnS) to tens of MW (e.g. in YAG or $CaF_2$).

A generic mid-IR bulk SCG setup is shown in FIG. 1. The system consists of a fs master oscillator (MO), frequency conversion stage (FC), fs laser amplifier (AMP), focusing optics (e.g. lens L), bulk medium for continuum generation (SCG). The system is configured to spectrally broad mid-IR continuum (Out). The frequency conversion stage FC is optional and could be employed prior or after the amplifier (AMP).

Typically, the peak power levels in excess of the critical power cannot be reached directly from the fs oscillator. Therefore, the amplification of fs pulses is required prior to their delivery to SCG stage. Furthermore, many standard fs oscillators (Ti:Sa, fiber-based) emit in near-IR. Therefore, an additional stage for frequency conversion of near-IR fs pulses to mid-IR range is required (prior or after the amplifier stage). On the one hand, the techniques for frequency conversion and amplification of fs pulses are well developed. On the other hand, the overall setup is very complex, bulky and high-cost, which greatly limits the practical use of existing mid-IR bulk SCG sources.

A need exists for a pico-second and even more preferentially a femtosecond laser with broad spectral output that does not rely on numerous expensive components to produce such output. The present inventors have satisfied that need by constructing a laser system with a single pass amplifier that simultaneously amplifies, spectrally broadens and compresses seed pulses.

SUMMARY OF THE DISCLOSURE

The present invention provides short-pulse, broad spectrum generating laser systems that benefit from an optical scheme configured to amplify and spectrally broaden a seed pulse in a gain media. Specifically, a bulk gain medium having non-linear properties concurrently receives a continuous or discontinuous pump output and a seed pulse. Guiding optics is utilized to superimpose the pump and master oscillator emissions on the bulk in a single pass which are emitted from respective optical pump and master oscillator devices. Additional optics is utilized for separating the output pulses from transmitted pump emission.

In one aspect of the disclosure, the peak power of pulses from the master oscillator approximately equals or exceeds the critical power (PC) for self-focusing in the bulk medium.

In another aspect of the disclosure that can be considered in light of the previous aspect, the nonlinear interaction of input pulses from the master oscillator with said bulk results in non-linear optical effects. These nonlinear optical effects may include any one or any combination of self-focusing, self-phase modulation, cross-phase modulation, four-wave mixing, filamentation and pulse compression.

In a further aspect of the disclosure taken separately or in combination with any of the above-disclosed aspects, the bulk media comprise TM:II-VI nanocrystals or polycrystals. Preferably, the TM:II-VI nanocrystals or polycrystals are one of Cr:ZnS, Cr:ZnSe, Cr:CdS, Fe:ZnSe or Fe:ZnS As to the pump utilized for the present invention in any of the above formulated aspects, it is preferable that it is configured as a laser selected from one of Er- or Tm-doped fiber, but TM:II-VI lasers are also contemplated within the scope of the invention. The pump may operate a continuous wave (CW) regime.

The present invention allows for the use of a master oscillator within the context of any of the above-mentioned aspects to produce the seed pulses that are input into the bulk. For purposes of this invention, the wavelength of the pulses must significantly exceed the bandgap of a material. Preferably, the master oscillator is a laser selected from pico- or femtosecond TM:II-VI lasers.

The laser system of the present invention can further benefit from additional optical components integrated in structures of any of the above-disclosed aspects. Preferably, the laser system includes at least one dispersive element placed before or after the bulk medium. Such dispersive elements may include any one or a combination of a plane-parallel plate, set of dispersive prisms, or dispersive mirror.

Preferably, the dispersive element is configured to compensate for the dispersion of said bulk and other components of the system and in another embodiment the dispersive element is configured to control the parameters of the input pulses from the master oscillator.

The present invention also provides a method implemented by a laser system configured in accordance with any of and a combination of the above disclosed aspects. The inventive method allows for enhancing the properties of a pico-second or femtosecond seed pulse by first inputting the seed pulse from a master oscillator into a bulk medium capable of increasing peak power and broadening the spectrum of the seed; and concurrently pumping the bulk medium with an optical pump sufficient to create a laser interaction with the seed pulse in the bulk medium such that output pulses with greater pulse energy and broader spectrum than those of the seed pulse are emitted from the bulk.

Preferably, the nonlinear interactions between propagating optical pulses and the bulk medium are enhanced by the laser interactions induced by optically pumping the bulk medium.

Preferably, the spectrum of output pulses is significantly broadened in comparison with the spectrum of input seed pulses from the master oscillator.

Preferably, the duration of output pulses is significantly shortened in comparison with the duration of input pulses from the master oscillator.

BRIEF DESCRIPTION OF THE DRAWINGS

The above and other aspects, features and advantages of the disclosure will become more readily apparent with the aid of the following drawings, in which:

FIG. 1 provides a generic mid-IR SCG system of the prior art.

FIG. 2a provides an optical schematic of a master oscillator with a "cold amplifier".

FIG. 2b provides measured spectra of the optical schematic of FIG. 2a.

FIG. 6 compares measured characteristics of the device with the pump.

FIG. 7 provides a schematic of a master oscillator for use with the present invention.

SPECIFIC DESCRIPTION

Figure 3:
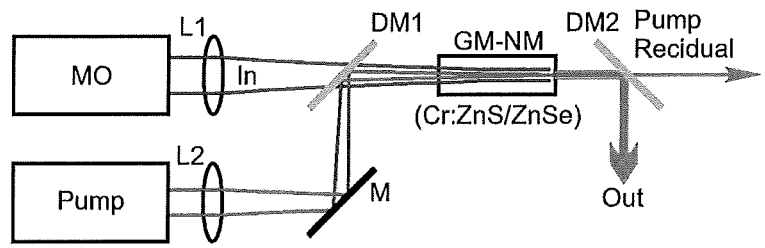
FIG. 3 provides an optical schematic of the present invention.

Reference will now be made in detail to embodiments of the invention. Wherever possible, same or similar reference numerals or letters are used in the drawings and the description to refer to the same or like parts or steps. The drawings are in simplified form and are not to precise scale. For purposes of convenience and clarity only, directional (up/down, etc.) or motional (forward/back, etc.) terms may be used with respect to the drawings. The term "couple" and similar terms do not necessarily denote direct and immediate connections, but also include connections through intermediate elements or devices.

The recent advent of femtosecond (fs) oscillators based on transition-metal-doped II-VI semiconductors (TM:II-VI) has allowed one to obtain fs optical pulses directly in mid-IR spectral range, thus avoiding the need for complex and bulky setups for frequency conversion of standard near-IR fs oscillators to mid-IR. Furthermore, very recent progress in polycrystalline Cr2+:ZnS and Cr2+:ZnSe Kerr-lens mode-locked laser technology has resulted in significant improvements in the output parameters of fs mid-IR oscillators in terms of average power (2 W), pulse energy (24 nJ), and pulse duration (≤29 fs).

It is important to note that ~0.5 MW peak power, which has been obtained directly from mid-IR polycrystalline Cr2+:ZnS fs oscillator, approximately equals the critical power for self-focusing in Cr2+:ZnS, Cr2+:ZnSe and other II-VI semiconductors.

Numerous experiments show that 0.5 MW level of the peak power is high enough to obtain some spectral broadening in polycrystalline Cr2+:ZnS/ZnSe/CdSe. The experiment on spectral broadening of mid-IR fs oscillator in bulk Cr2+:ZnS, Cr2+:ZnSe, and Cr2+:CdSe is illustrated in FIG. 2 (b).

Specifically, FIGS. 2 (a) and 2 (b) set forth respective optical schematic and the measured spectra of the present invention where a mid-IR fs laser is used as the seed laser and the bulk is any one of the following II-VI materials: Cr2+:ZnS/ZnSe/CdSe. FIG. 2(a) provides a schematic of the setup consisting of: fs master oscillator (MO), focusing lens (L), bulk Cr2+:ZnS/ZnSe/CdSe material. FIG. 2(b) illustrates the measured spectra of pulses shown on in logarithmic scale: input (dashed line) and output (solid lines). In this configuration, the bulk is not pumped and as such this considered a "cold amplifier", whereby the only energy imparted into the bulk is from the seed pulses.

FIG. 3 sets forth an optical schematic of the present invention whereby a "hot amplifier" is used. The pump used for his configuration was an Erbium fiber laser sold by IPG Photonics, Oxford, Mass., model number ELR-20-1567-LP. Clearly, a "hot amplifier" is bulk that is concurrently pumped and subject to the seed pulse. This setup produces spectral broadening and amplification of fs optical pulses in a single pass. The system provided in FIG. 3 comprises a fs master oscillator (MO); focusing optics for MO beam (L1); pump laser (Pump); focusing optics for Pump beam (L2); optics for superimposing Pump and MO beams (e.g. dichroic mirror DM1); optional optics for beam steering (M); a bulk material, which combines properties of the laser gain medium and nonlinear medium (GM-NM), e.g. polycrystalline Cr2+:ZnS/ZnSe; and optics for separation of the output beam (Out) from the residual pump radiation (e.g. dichroic mirror DM2).

In the schematic of FIG. 3, the emission from mid-IR fs master oscillator (MO) is superimposed with CW emission of the Er-doped fiber laser (Pump) using a dichroic mirror DM1. The MO and Pump beams are focused with the GM-NM—polycrystalline Cr2+:ZnS or Cr2+:ZnSe (GM-NM). The latter combines properties of the laser gain medium and the nonlinear medium: (i) optical pumping of GM-NM results in amplification of input pulses from MO (like in conventional laser amplifier); (ii) nonlinearity of GM-NM results in spectral broadening of input pulses; (iii) amplification of pulses during their propagation through GM-NM results in increase of their peak power and, hence, in further spectral broadening, etc. Apparently, the initial spectral broadening is achieved at high enough peak power of the input pulses.

Figure 4:
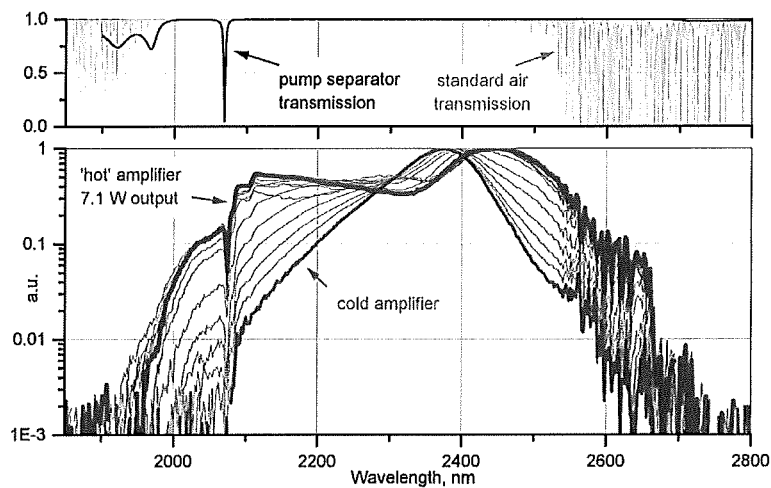
FIG. 4 provides measured spectra of output pulses emitted by the schematic of FIG. 3.
Figure 5:
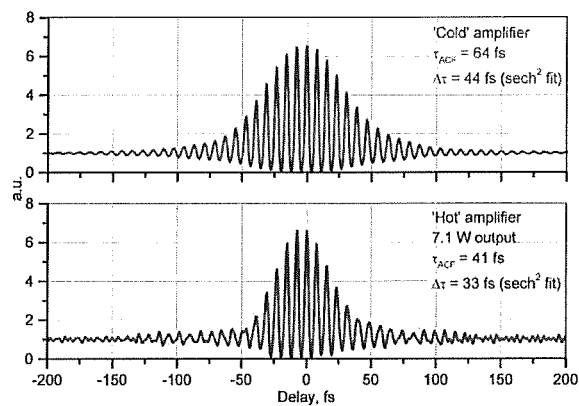
FIG. 5 provides the autocorrelations of output pulses.

Measured characteristics of the proposed device are summarized in FIGS. 4, 5, 6. The experiments were carried out using polycrystalline Cr2+:ZnS as the bulk, that is, the GM-NM (similar results were obtained using polycrystalline Cr2+:ZnSe).

These results mean that there was amplification, spectral broadening and compression of mid-IR fs pulses in a single pass through the bulk. The device is based on polycrystalline Cr2+:ZnS or Cr2+:ZnSe, which is optically pumped by low cost and efficient cw fiber laser. There is little doubt that the output characteristics of the device can be further significantly improved.

FIG. 4 sets forth the measured spectra of output pulses. 'Cold spectrum' was measured with the pump laser turned off; that is, with a "cold amplifier". The 'hot spectrum' was measured at 20 W CW pump power input concurrent with the seed pulses, such that is was a "hot amplifier" and 7.1 W average output power was an increase from the 1.9 W of the seed. The grey lines illustrate spectral broadening with increase of the pump power. Top graph shows transmissions of 1 m standard air and of the pump separator (DM2). As can be seen, the obtained spectrum completely fills 2.0-2.5 µm atmospheric transparency window.

FIG. 5 provides the measured autocorrelations of output pulses. 'Cold autocorrelation' was measured with the Pump laser turned off; 'hot autocorrelation' was measured at 20 W CW pump power and 7.1 W output power; As can be seen, amplification of input pulses is accompanied by their compression from 44 fs to about 33 fs.

FIG. 6 provides the measured characteristics of the device vs pump power. Top graph compares spectral bandwidth (at −10 dB level) and pulse duration. The bottom graph compares gain of the amplifier. As can be seen, an increase of the pump power results in (i) spectral broadening, (ii) pulse compression, (iii) increase of output power. It is important to note that amplification of fs pulses occurs as efficiently as amplification of CW laser.

The master oscillator used in the present invention is shown in FIG. 7. This laser was described in greater detail in PCT/US2015/23232 filed on 30 Mar. 2015, the contents of which are fully incorporated by reference in its entirety. As FIG. 7 provides, the laser is optically pumped at 1567 nm by an Er-doped fiber laser (EDFL). An anti-reflective (AR) coated polycrystalline Cr2+:ZnS gain element is mounted in the resonator at normal incidence between two curved mirrors. The gain element is 5 mm long with 11% low-signal transmission and is cooled with room temperature water. The resonator's legs are unequal with a typical ratio of 2:5. The laser has two optical outputs: mid-IR through the output coupler (OC) and SHG trough curved dichroic mirror (DM) with high transmission in SHG wavelength range. The reflectivity and the group delay dispersion (GDD) of the optical coatings were optimized in the 2200-2700 nm wavelength range. Net GDD of the resonator can be adjusted in discrete steps by changing a type and the number of installed high reflectors (HR) with negative GDD. Third order dispersion (TOD) of the gain element was compensated by a dedicated mirror (HR*). The laser was optimized for maximum CW output power. The distance between the curved mirrors was then fine-adjusted in order to enable Kerr-Lens mode-locked regime (initiated by OC translation). Spectral and temporal parameters of the mode-locked laser were characterized using a 0.15 m dual grating monochromator and an interferometric autocorrelator. Distortions of the output pulses due to propagation trough 3.2 mm thick ZnSe substrate of the OC (GDD=+710 fs2 at 2400 nm) were compensated outside the resonator by a combination of 5 mm thick YAG plate and TOD compensator HR*.

Those skilled in the art will recognize or be able to ascertain using no more than routine experimentation many equivalents to the specific embodiments of the invention described herein. The disclosed schematics can be used with any light imaging system, but the impetus for the presently disclosed structure lies in. It is therefore to be understood that the foregoing embodiments are presented by way of example only and that within the scope of the appended claims and equivalents thereto, the invention may be practiced otherwise than as specifically described. The present disclosure is directed to each individual feature, system, material and/or method described herein. In addition, any combination of two or more such features, systems, materials and/or methods, if such features, systems, materials and/or methods are not mutually inconsistent, is included within the scope of the present invention.

The invention claimed is:

1. A method of enhancing properties of sub-nanosecond pulses comprising:
    coupling pulsed signal light at a first wavelength into a bulk gain medium, thereby guiding input sub-nanosecond pulses of the signal light through the bulk gain medium in a single pass, wherein each input sub-nanosecond pulse of the signal light has a first pulse duration, first spectral width and first pulse peak power; and
    coupling pump light at a second wavelength, which is different from the first wavelength, into the bulk gain medium while guiding the sub-nanosecond pulses there through, thereby outputting sub-nanosecond pulses at the first wavelength such that each output sub-nanosecond pulse has a:
        second pulse duration shorter than the first pulse duration,
        second spectral width broader than the first spectral width, and
        second pulse peak power higher than the first pulse peak power; and
    generating the signal light by pico- or femtosecond TM:II-VI lasers prior to the coupling of the input sub-nanosecond pulses into the bulk gain medium such that the first peak power of the sub-nanosecond pulses at least equals to a critical power ($P_C$) for self-focusing in the bulk gain medium, the bulk gain medium being selected from TM:II-VI nanocrystals or polycrystals which are made from Cr:ZnS, Cr:ZnSe, Cr:CdS, Fe:ZnSe or Fe:ZnS.

2. The method of claim 1, wherein the pumping of the bulk gain medium includes a continuous wave pumping or pulsed pumping by a pump fiber laser which is selected from Er- or Tm-doped fiber lasers or TM:II-VI lasers.

3. The method of claim 1 further comprising optically superimposing and focusing the signal light and pumping light on the bulk gain medium.

4. The method of claim 1, wherein the guiding of the input sub-nanosecond pulses through the bulk gain medium includes interacting between the input sub-nanosecond pulses and bulk medium, thereby producing a nonlinear effect which includes self-focusing, self-phase modulation, cross-phase modulation, or four-wave mixing or a combination thereof.

5. The method of claim 1 further comprising optically separating the output sub-nanosecond pulses of the signal light and pump light, wherein the sub-nanosecond pulses include femtosecond or picosecond pulses.

6. A sub-nanosecond, broad spectrum generating laser system comprising:
    a master oscillator emitting pulsed signal light of input sub-nanosecond pulses along a path at a first wavelength, the input sub-nanosecond pulses each having a first pulse duration, first spectral width and first pulse peak power;
    a nonlinear bulk gain medium downstream from the master oscillator;

an optical pump emitting continuous or discontinuous light pump at a second wavelength different from the first wavelength; and an input optical assembly between the master oscillator and nonlinear bulk gain medium, the input optical assembly being configured to superimpose and focus the pulsed signal and pump light on the bulk gain medium in a single pass such that the nonlinear bulk gain medium outputs sub-nanosecond pulses at the first wavelength, wherein each output sub-nanosecond pulse has a:

second pulse duration shorter than the first pulse duration,
second spectral width broader than the first spectral width, and second pulse peak power higher than the first pulse peak power; and wherein the nonlinear bulk gain medium includes TM:II-VI nanocrystals or polycrystals made form one of Cr:ZnS, Cr:ZnSe, Cr:CdS, Fe:ZnSe or Fe:ZnS.

7. The laser system of claim 6 further comprising an output optical assembly configured to separate the output sub-nanosecond pulses from the pump light downstream from the nonlinear bulk gain medium.

8. The laser system of any of claim 6, wherein the master oscillator is operative to generate the input sub-nanosecond pulses each with a peak power at least equal to critical power ($P_C$) for producing a nonlinear effect in the nonlinear bulk gain medium which includes one of self: focusing, self-phase modulation, cross-phase modulation, four-wave mixing, filamentation, pulse compression or a combination of these.

9. The laser system of claim 6, wherein the optical pump is selected from Er-, Tm-doped fiber lasers or TM:II-VI lasers, the master oscillator being selected from pica- or femtosecond TM:II-VI lasers.

10. The laser system of claim 6 further comprising at least one dispersive element located upstream or downstream from the nonlinear bulk gain medium, the dispersive element being one of a plane-parallel plate, a set of dispersive prisms, dispersive mirrors, or a combination of the these, the dispersive element being configured to control parameters of the input sub-nanosecond pulses.

* * * * *